(12) United States Patent
Slesarenko et al.

(10) Patent No.: US 10,896,029 B2
(45) Date of Patent: Jan. 19, 2021

(54) METHOD FOR CONSTRUCTING A GRAPH DATA STRUCTURE

(71) Applicant: HUAWEI TECHNOLOGIES CO., LTD., Guangdong (CN)

(72) Inventors: Alexander Vladimirovich Slesarenko, Moscow (RU); Anton Yurievich Orlov, Moscow (RU); Hongbo Zhang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 312 days.

(21) Appl. No.: 15/004,018

(22) Filed: Jan. 22, 2016

(65) Prior Publication Data

US 2016/0139894 A1    May 19, 2016

Related U.S. Application Data

(63) Continuation of application No. PCT/RU2013/000631, filed on Jul. 23, 2013.

(51) Int. Cl.
  *G06F 8/41*  (2018.01)
  *G06F 9/455*  (2018.01)
  *G06F 8/34*  (2018.01)

(52) U.S. Cl.
  CPC ........... *G06F 8/433* (2013.01); *G06F 8/34* (2013.01); *G06F 8/44* (2013.01); *G06F 9/4552* (2013.01)

(58) Field of Classification Search
  CPC .......... G06F 8/433; G06F 9/4552; G06F 8/44; G06F 8/34; G06F 11/41; G06F 11/3608
  See application file for complete search history.

(56) References Cited

U.S. PATENT DOCUMENTS 6,594,783 B1 * 7/2003 Dollin .................... G06F 8/427
                                                                 714/38.14
7,818,736 B2 * 10/2010 Appavoo ................ G06F 8/656
                                                                 717/168

(Continued)

FOREIGN PATENT DOCUMENTS

CN    102541514 A    7/2012
CN    103345402 A    10/2013

OTHER PUBLICATIONS

Bailey et al, Digital Material: A flexible atomistic simulation code, Jan. 11, 2006, arxiv.org>cond-mat>arxiv:cond-mat/0601236, Cornell university (Year: 2006).*

(Continued)

*Primary Examiner* — Jung W Kim
*Assistant Examiner* — Bruce S Ashley
(74) *Attorney, Agent, or Firm* — Kilpatrick Townsend & Stockton LLP

(57) ABSTRACT

The disclosure relates to a method for constructing a graph data structure as an intermediate representation of source code for a compiler configured for compiling the source code into executable machine code running on a processor of a computer system, wherein program operations of the source code are represented in an object-oriented programming language by objects of classes that form a hierarchy growing from a base node class of the graph data structure, the method comprising: producing new nodes of the graph data structure by calling factory methods associated with existing nodes of the graph data structure based on a factory method design pattern implemented in the nodes of the graph data structure, wherein the nodes of the graph data structure are identified by symbols; and using the symbols as proxies of the nodes of the graph data structure according to a proxy design pattern.

13 Claims, 17 Drawing Sheets

(56) References Cited

U.S. PATENT DOCUMENTS

| | | | |
|---|---|---|---|
| 8,359,298 B2* | 1/2013 | Schacher | G06F 17/30958 707/705 |
| 8,789,026 B2* | 7/2014 | Auerbach | G06F 8/456 717/120 |
| 2007/0038988 A1* | 2/2007 | Das | G06F 9/4431 717/157 |
| 2008/0134207 A1* | 6/2008 | Chamieh | G06F 9/4488 719/315 |
| 2013/0036408 A1 | 2/2013 | Auerbach et al. | |

OTHER PUBLICATIONS

Tiark Rompf et al., "Building-Blocks for Performance Oriented DSLs", arXiv preprint arXiv:1109.0778, IFIP Working Conference on Domain-Specific Languages, 2011, total 25 pages.

Tiark Rompf et al., "Lightweight Modular Staging: A Pragmatic Approach to Runtime Code Generation and Compiled DSLs", ACM Sigplan Notices, vol. 46, No. 2, ACM 2010, total 10 pages.

Tiark Rompf et al., "Optimizing Data Structures in High-Level Programs, New Directions for Extensible Compilers based on Staging", ACM Sigplan Notices, vol. 48, No. 1, 2013, total 14 pages.

Nathaniel Nystrom et al., "Polyglot: An Extensible Compiler Framework for Java", Proceedings of the 12th International Conference on Compiler Construction, Apr. 2003, total 15 pages.

Alexander V. Slesarenko, "Polytypic Staging: a new approach to an implementation of Nested Data Parallelism in Scala", Keldysh Institute preprints, 2012, No. 5, total 25 pages.

Cliff Click et al., "A Simple Graph-Based Intermediate Representation", ACM Sigplan Notices 30.3 (1995):35-49, total 15 pages.

Keith Cooper et al., "Comp 412: Compiler Construction for Undergraduates", Syllabus for Department of Computer Science, Rice University, 2015, total 3 pages.

Alfred V. Aho et al., Compilers: Principles, Techniques, & Tools, Second Edition, Pearson Addison Wesley Publishers, Boston, MA, 2007, Table of Contents, Chapters 1 and 2, total 70 pages.

Alexander Slesarenko et al., "First-class Isomorphic Specialization by Staged Evaluation", Proceeding WGP '14 Proceedings of the 10th ACM SIGPLAN workshop on Generic programming, Aug. 2014, total 12 pages.

Ray Toal, "Intermediate Representations", Loyola Marymount University, http://cs.lmu.edu/~ray/notes/ir/, downloaded Jun. 30, 2016, total 11 pages.

Alexander Slesarenko et al., "Scalan: A Framework for Domain-Specific Hotspot Optimization (Invited Tutorial)", Proceeding FHPC 2015 Proceedings of the 4th ACM SIGPLAN Workshop on Functional High-Performance Computing, 2015, total 1 page.

Fred Chow, "The Challenge of Cross-language Interoperability, The increasing significance of intermediate representations in compilers", Queue, vol. 11, issue 10, Nov. 2013, total 16 pages.

Gamma E et al: "Design Patterns", Design Patterns, XX, XX, Jan. 1, 1996 pp. 87-116, XP002165691.

Gamma E et al: "Design Patterns, Passage", Design Patterns, XX, XX, Jan. 1, 1996 pp. 14-18,207, XP002342080.

* cited by examiner

```
1 Float average(Array<Float> arr) {
2    Float sum = arr.sum;
3    Int len = arr.length;
4    return sum / len;
5 }
```

200

```
501
    class Graph {

Sym addNode(Node node) { ... }    // add node to
    this graph

Node getNode(Sym symbol) { ... }  // lookup node by
    its symbol

Sym findNode(Node node) { ... }   // find the node
    in the graph

503 } abstract class Node {

Graph g;              // reference to the owner of
    this node

Sym nodeSymbol();     // returns symbol of this node

505 } class FloatArrayLength: Node {

Sym arr;              // symbol of the node that
    represents array

```
1 Graph g = new Graph();
2 Sym arr = g.addNode(new Var());
3 Sym sum = g.addNode(new FloatArraySum(arr));
4 Sym len = g.addNode(new FloatArrayLength(arr));
5 Sym res = g.addNode(new FloatDiv(sum, len));
```

```
1 <T> T average(Array<T> arr, DivOp<T>
  div) {
2    T sum = arr.sum;
3    Int len = arr.length;
4    return div.apply(sum, len);
5 }
```

```
abstract class Array<T>: Node {
  Node length() {...}
  Node sum() {...}
}
class FloatArray: Array<Float> {
  Node length() {
    return new FloatArrayLength(nodeSymbol);
  }
}
```

Fig. 11

```
1400
1403   interface Array<T> {
          Sym<Int> length();
          Sym<T> sum();
       }
1407   class Sym<T> { ... }
1405   class ArraySym<T>: Sym<Array<T>> implements Array<T> {
          Sym<Int> length() {
       return g.addNode(new FloatArrayLength(nodeSymbol));
          }
       }
       abstract class Node<T> {
          Graph g;                  // reference to the owner of this node
          Sym<T> nodeSymbol();      // returns symbol of this node
       }
1401   class ArrayNode<T> extends Node<Array<T>> implements Array<T> {
       }
       class FloatArray: ArrayNode<Float> {
          Sym<Int> length() {
       return g.addNode(new FloatArrayLength(nodeSymbol));
          }
       }
       class Graph {
          <T> Sym<T> addNode(Node<T> node) { ... }    // add node to this graph
          <T> Node<T> getNode(Sym<T> symbol) { ... }  // lookup node by its symbol
          <T> Sym<T> findNode(Node<T> node) { ... }   // find the node in the graph
       }
```

Fig.14

```
1 <T> Sym<T> average(ArraySym<T> arr, DivOp<T> div) {
2   Sym<T> sum = arr.sum();
3   Sym<Int> len = arr.length();
4   return div.apply(sum, len);
5 }
```

Fig. 15

```
1600
1601 ──▶ class Graph {
           // lookup table to store all nodes of this graph
1603 ──▶   private Hashtable<Sym<?>, Node<?>> symbols = new Hashtable<Sym<?>,
           Node<?>>();
1605 ──▶
           private <T> Sym<T> createProxySym(Node<T> node) {
           // create proxy symbol for the node
           // implementation of this methods can use any existing method
           // to implement Proxy design pattern
           // not specified in this patent application
           }

1607 ──▶   // find the node in the graph
           public <T> Sym<T> findNode(Node<T> node){
             for(Map.Entry<Sym<?>, Node<?>> e : symbols.entrySet()){
               if (e.getValue().equals(node)){
                   return (Sym<T>)e.getKey();
               }
             }
             return null;
           }

1609 ──▶   // add node to this graph
           public <T> Sym<T> addNode(Node<T> node){
             Sym<T> newSym = createProxySym(node);
             symbols.put(newSym, node);
             node.g = this;        // assign this graph as owner of the node
             return newSym;
           }

1611 ──▶   // find symbol of the node if it is in the graph or add the node
           public <T> Sym<T> toSymbol(Node<T> node){
             Sym<T> existingNode = findNode(node);
             if (existingNode != null) {
               return existingNode;
             }
             return addNode(node);
           }

1613 ──▶   // lookup node by its symbol
           public <T> Node<T> getNode(Sym<T> symbol){
             return (Node<T>)symbols.get(symbol);
           }
         }
```

Fig.16

METHOD FOR CONSTRUCTING A GRAPH DATA STRUCTURE

CROSS-REFERENCE TO RELATED APPLICATIONS

This application is a continuation of International Application No. PCT/RU2013/000631, filed on Jul. 23, 2013, which is hereby incorporated by reference in its entirety.

TECHNICAL FIELD

The present invention relates to a method for constructing a graph data structure and to an apparatus for compiling a source code into executable machine code running on a processor of a computer system.

In particular, the invention relates to the field of computer software engineering. More specifically, it relates to a method and apparatus for compiling source code by using intermediate code representation. Even more specifically it relates to methods of representing source programs, i.e. source programs that should be compiled into executable machine code in machine memory.

BACKGROUND

Compiling a computer program involves converting a high level language code, i.e. the source code 101 into instructions 109 of the processor of a computer system. This process is shown in FIG. 1. A source code 101 is compiled by a compiler 111 into an executable program code 109. The compiler 111 constructs intermediate representation 103 based on the source code 101, optimizes 105 the intermediate representation 103 and generates 107 an executable file "program.exe" that can be used as the program code 109.

Intermediate representation is typically used by the compiler to represent source program in a way that is amenable to analysis and transformations. Analyses and transformations are typically performed by the compiler to optimize source program for fast execution. The compiler itself is a program and it is written in some language. Usually it is a complex task to develop a compiler and this task is typically divided into many subtasks. Hereinafter, the case is considered when the compiler is written in object-oriented language.

There are many ways to represent source program as data structure in machine memory. It is typically some kind of "abstract syntax trees" or "graph" based representations. Selection of one of them is the matter of specific problems at hand. Prior to this invention there exists an intermediate representation (IR) of programs that is described by the document "C. Click and M. Paleczny, A simple graph-based intermediate representation, 1995". This intermediate representation has the following two properties related to the invention: First, it is graph-based, i.e. it is a "graph data structure" with some specific information stored inside graph nodes. Second, it can be implemented in an object-oriented language. Nodes of the graph-based IR correspond to operations of the source program. Edges correspond to dataflow between operations. The order of execution of operations is not explicitly specified by the graph and is dictated by dependencies between the nodes.

Graph-based IR in machine memory is a data structure made of objects. In the following, it is named just "graph" for short. Typically to construct a graph the program methods of object 'Graph' are called to add new nodes to the graph. Each graph node in the graph data structure is represented by a pair (S,N): 'S' is a globally unique identifier which is traditionally called symbol which is typically just a number. All symbols are represented by instances of the class 'Sym'. Each symbol refers to a node it identifies and can be used to access the node. 'N' is an instance of some class derived from the 'Node' class. The concrete class of the node denotes an operation. Different operations are represented by different classes. The classes of operations can form a hierarchy of classes. Abstract classes in the hierarchy represent some subset of operations. Edges of the graph are represented by symbols that are stored in nodes.

FIG. 2 shows an example source program 200 ranging from line 1 to line 5. When compiled and run, the function calculates an average of all the values in an array. It behaves like described in the following. Line 1 depicts a function "average" where 'an' is an argument of the function. When the function is called the parameter 'an' it is a reference to an instance of class 'Array<Float>' which represent an array (or an indexed collection) of values. It is the array of floating point numbers that is supplied by the caller of the function and it should be processed by the function. The body of the function is executed sequentially step-by-step. Line 2 is an invocation of the method 'sum' of the class 'Array' using the instance 'an'. The method calculates the sum of all elements in the array. Line 3 is an invocation of method 'length' of the class 'Array' using the instance 'an'. The method calculates the number of the elements in the array. Finally, on line 4 an average value is calculated and returned as a result of the function. Line 5 shows the end of the source program 200.

A graph-based intermediate representation 300 of the program from FIG. 2 is shown in FIG. 3. The parameter 'an' 301 is used by the two functions 'FloatArraySum(arr)' 303 and 'FloatArrayLength(arr)' 305 providing the intermediate results 'sum' and 'len' which are used by the function 'FloatDiv(sum, len)' to provide the final result 'res' 307.

The in-memory representation 400 of the program graph is shown in FIG. 4. A first symbol 401 is associated with the parameter 'an' 301 described in FIG. 3. A second symbol 403 is associated with the function 'FloatArraySum(arr)' 303 described in FIG. 3, where the argument of the function corresponds here to the first symbol 'Sym(1)' 401. A third symbol 405 is associated with the function 'FloatArrayLength(arr)' 305 described in FIG. 3, where the argument of the function corresponds here to the first symbol 'Sym(1)' 401. A fourth symbol 407 is associated with the function 'FloatDiv(sum, len)' 307 described in FIG. 3, where the arguments of the function correspond here to the second symbol 'Sym(2)' 403 and the third symbol 'Sym(3)' 405. The symbols 401, 403, 405, 407 etc. describe graph nodes of the graph.

The programming interfaces 500 of the classes that are used to represent graphs as data structure in machine memory are shown in FIG. 5. The programming interfaces 500 define a class 'Graph' 501, an abstract class 'Node' 503 and a class 'FloatArrayLength' 505. The class 'Graph' 501 comprises a first function 'Sym addNode(Node node)' configured to add a node to this graph, a second function 'Node getNode(Sym symbol)' configured to lookup a node by its symbol and a third function 'Sym findNode(Node node)' configured to find the node in the graph. The abstract class 'Node' 503 comprises a graph 'g' as a reference to the owner of this node and a symbol 'nodeSymbol( )' that returns the symbol of this node. The class 'FloatArrayLength' 505 comprises the symbol 'an' that is the symbols of the node representing the array 'an'. Nodes of the graph correspond to operations of the source program. For example 'FloatArrayLength' corresponds to 'arr.length( )' in the program code.

The graph building process 600 is shown in FIG. 6. It is a step-by-step construction of the graph shown in FIG. 3. At line 1, a graph 'g' is constructed by the function 'new Graph( )'. At line 2, the symbol 'an' is set to the function 'g.addNode(new Var( )'. At line 3, the symbol 'sum' is set to the function 'g.addNode(new FloatArraySum(arr))'. At line 4, the symbol 'len' is set to the function 'g.addNode (new FloatArrayLength(arr))'. At line 5, the symbol 'res' is set to the function 'g.addNode(new FloatDiv(sum, len))'. The edges of the graph are represented by symbols that are stored in nodes. For example 'FloatDiv' node keeps the symbols 'sum' and 'len' for two operands of the operation.

The prior art as described by FIGS. 1 to 6 shows the following two main problems. First, lots of "boilerplate code" is used in graph construction. Even for a simple program as depicted in FIG. 2 it is tedious to construct a graph using an interface of 'Graph' class. The graph building code should look as close as possible to the source code shown in FIG. 2, but it is impossible with explicit graph building procedure similar to the one shown in FIG. 6. Secondly, the code is hard to generalize. When considering the task of generalizing the example from FIG. 2 the function "average" should handle not only an array of 'Float' but also an array with elements of any type 'T' which supports division by integer. For example, arrays of 'Int', 'Double', 'Decimal' and other types. One way to abstractly form a type of an array element would be to introduce a type parameter 'T' which gives the code 700 as shown in FIG. 7. The function 'average' of type T and arguments 'Array<T> arr' and 'DivOp<T> div' comprises the instructions 'T sum=arr.sum' as shown on line 2, 'Int len=arr.length' as shown on line 3 and 'return div.apply(sum, len)' as shown on line 4. This generalized code has an additional parameter to abstract from the division operation, but the overall structure of the code remains the same as the original sample depicted in FIG. 2.

When attempting to perform the same generalization for the graph building procedure as shown in FIG. 6, the problem is that the code contains concrete classes 'FloatArraySum', 'FloatArrayLength', 'FloatDiv' and they expect the array to contain items of type 'Float'. It is not clear how to generalize this code.

SUMMARY

It is the object of the invention to provide an improved technique for compiling a source code, in particular for the subtask of constructing intermediate representation of the source code.

This object is achieved by the features of the independent claims. Further implementation forms are apparent from the dependent claims, the description and the figures.

The invention is based on the finding that the boilerplate code in graph building as described above can be eliminated by using a new method which allows the graph building code to look as close as possible to the source code of the source program. This new method is designed to implement "staged evaluation" in object-oriented languages. The new method is configured to extend a prior art graph-based IR data structure to support staged evaluation of "generic programs", i.e. programs written in terms of "to-be-specified-later" types that are then instantiated when needed for specific types provided as parameters.

In the presentation of the new method described hereinafter, the Java language is used for illustration. However, the new method can be used in any object-oriented language which supports the features of virtual methods, interfaces or abstract methods and parameterized types (generics). A virtual function or virtual method is a function or method whose behavior can be overridden within an inheriting class by a function with the same signature. An abstract method is one with only a signature and no implementation body. It is often used to specify that a subclass must provide an implementation of the method. Abstract methods are used to specify interfaces in some computer languages. A parameterized type defines a family of related types. For example, the "Array" parameterized type defines the types "Array [Int]", "Array[Char]", "Array[Array[Int]]", and so on.

The new method that is also called method of "staged evaluation" can be implemented by the following steps: Extending interfaces of a graph data structure and the nodes and symbols of the graph to support type parameters; making the nodes of the graph serving as factories, where some nodes can implement factory methods which can be invoked to create other nodes of the graph; extending a role of the symbols by using the symbols as proxies of the graph nodes according to a proxy design pattern; and implementing core methods of the graph data structure based on the preceding steps. Any available implementation of the proxy patterns can be used in the language of choice, e.g. Java. A full listing of the methods is described below with respect to FIG. 16 where a method implementing the "staged evaluation" using Java language is described.

In order to describe the invention in detail, the following terms, abbreviations and notations will be used:

Abstract Syntax

Tree (AST): A tree data structure that is used to represent the abstract syntactic structure of source code. Each node of the tree denotes a construct occurring in the source code.

Compiler: A computer program that takes source code of source program and produces executable machine code.

Executable machine code: A sequence of machine code instructions to be executed by a processor to perform a given task.

Factory method design pattern: A design pattern in object-oriented programming. The essence of this pattern is to define an interface for creating an object (a so called factory method), but let the classes that implement the interface decide which class to instantiate.

Generic program: A program written in terms of to-be-specified-later types that are then instantiated when needed for specific types provided as parameters. This approach permits writing common functions or types that differ only in the set of types on which they operate when used, thus reducing duplication.

Graph data structure: A graph data structure consists of a finite set of ordered pairs, called edges, of certain entities called nodes or vertices. An edge (x,y) is said to point or go from x to y. The nodes may be part of the graph structure, or may be external entities represented by integer indices or references.

Intermediate Representation (IR): A data structure that is used inside a compiler for representing the source program and allows analysis and transformation before outputting the executable machine code. Typically this is a graph or a tree data structure with some specific information inside nodes. As the intermediate representation contains all the information needed to evaluate the program (if given the input data), we can say about the evaluation of the intermediate representation as an equivalent way to execute the program.

Class (in object-oriented programming: In object-oriented programming, a class is a construct that is used to create instances of itself—referred to as class instances, class objects, instance objects or simply objects. A class defines constituent members which enable its instances to have state and behavior. Data field members (member variables or instance variables) enable a class instance to maintain state. Other kinds of members, especially methods, enable the behavior of class instances. Classes define the type of their instances.

Method (in object-oriented programming): In object-oriented programming, a method is a subroutine (or procedure) associated with a class. Methods define the behavior to be exhibited by instances of the associated class at program run time. Methods have the special property that at runtime, they have access to data stored in an instance of the class they are associated with and are thereby able to control the state of the instance.

Object-oriented language, object-oriented programming: Object-Oriented (OO) language is a computer programming language that supports object-oriented programming (OOP). OOP is a programming paradigm using "objects"—usually instances of a class—consisting of data fields and methods together with their interactions—to design applications and computer programs. Programming techniques may include features such as data abstraction, encapsulation, messaging, modularity, polymorphism, and inheritance.

Operational semantics: The operational semantics for a programming language describes how a valid program is interpreted as sequences of computational steps (typically using some hypothetical computer). These sequences then are the meaning of the program.

Proxy design Pattern: A design pattern in object-oriented programming. A proxy, in its most general form, is a class functioning as an interface to something else (some subject). A client instead of directly accessing the subject calls methods of the proxy which delegates the calls to the subject.

Semantic equivalence (of programs): Two programs $P_1$ in language $L_1$ and $P_2$ in language $L_2$ are said to be semantically equivalent if for any input data their interpretation with respect to the operational semantics of languages $L_1$ and $L_2$ correspondingly yields the same result.

Source code: A textual representation of a source program using some programming language.

Source program: A computer program that is used as an input to the "compiler". It is translated into "executable machine code".

Staged code: Staged code for a source program P is a program P' such that evaluation of P' produces intermediate representation, which is semantically equivalent to the program P.

Tree data structure: A data structure that simulates a hierarchical tree structure with a set of linked nodes.

Virtual methods: A virtual function or virtual method is a function or method whose behavior can be overridden within an inheriting class by a function with the same signature.

Interfaces, abstract methods: An abstract method is one with only a signature and no implementation body. It is often used to specify that a subclass must provide an implementation of the method. Abstract methods are used to specify interfaces in some computer languages.

Parameterized types (generics): A parameterized type defines a family of related types. For example, the "Array" parameterized type defines the types "Array [Int]", "Array[Char]", "Array[Array[Int]]", and so on.

According to a first aspect, an embodiment of the invention relates to a method for constructing a graph data structure as an intermediate representation of source code for a compiler configured for compiling the source code into executable machine code running on a processor of a computer system, wherein program operations of the source code are represented in an object-oriented programming language by objects of classes that form a hierarchy growing from a base node class of the graph data structure, the method comprising: producing new nodes of the graph data structure by calling factory methods associated with existing nodes of the graph data structure based on a factory method design pattern implemented in the nodes of the graph data structure, wherein the nodes of the graph data structure are identified by symbols; and using the symbols as proxies of the nodes of the graph data structure according to a proxy design pattern.

The method according to the first aspect is able to eliminate boilerplate code in building the graph-based intermediate representation of programs when performed in an object-oriented language. The method further allows implementing graph-based intermediate representation in an object-oriented language to easily support generic programs.

The method is targeted to compiler developers who use object-oriented languages as their implementation tools, and facilitates the development of programming languages.

In a first possible implementation form of the method according to the first aspect, each node of the graph data structure is implemented as an object of a class.

In a second possible implementation form of the method according to the first aspect as such or according to the first implementation form of the first aspect, the symbols are used as typed proxies to the corresponding nodes of the graph data structure.

By using typed proxies to the corresponding nodes of the graph, the method can be generalized for supporting staged evaluation of generic programs.

In a third possible implementation form of the method according to the second implementation form of the first aspect, the factory methods use instances of the symbols, so that when a method of a symbol is called the corresponding method of the node is executed.

When the factory methods use instances of the symbols, generic programming is supported, i.e. a program written in terms of to-be-specified-later types that are then instantiated when needed for specific types provided as parameters. This approach permits writing common functions or types that differ only in the set of types on which they operate when used, thus reducing duplication.

In a fourth possible implementation form of the method according to the first aspect as such or according to any of the preceding implementation forms of the first aspect, depending on a type of a node of the graph data structure each class of the node comprises factory methods.

When each class of the node comprises factory methods, the behavior to be exhibited by instances of the associated class can be specified at program run time. Factory methods have the special property that at runtime, they have access to data stored in an instance of the class they are associated with and are thereby able to control the state of the instance.

In general it is possible for graph nodes not to contain any factory method. So some graphs have factory methods, other graphs do not have factory methods.

In a fifth possible implementation form of the method according to the first aspect as such or according to any of the preceding implementation forms of the first aspect, the factory methods are configured to produce the new nodes along with connections to the existing nodes.

The factory methods may produce the new nodes at runtime, thereby providing flexibility to the machine program.

In a sixth possible implementation form of the method according to the first aspect as such or according to any of the preceding implementation forms of the first aspect, each factory method comprises a subroutine associated with a class of the node of the graph data structure, the factory method determining a behavior to be exhibited by instances of the associated class at program runtime.

When the behavior is determined at runtime, hardware can be saved as the method is able to adapt to changing requirements without the need of hardware changes.

In a seventh possible implementation form of the method according to the first aspect as such or according to any of the preceding implementation forms of the first aspect, the proxy comprises a class functioning as an interface to a subject.

The proxy can thus redirect accesses from a client to the desired subject thereby reducing complexity in the client.

In an eighth possible implementation form of the method according to the first aspect as such or according to any of the preceding implementation forms of the first aspect, the proxy design pattern is configured to provide a proxy with a factory method for delegating calls of a client calling the factory method of the proxy to a called subject.

The client can call a proxy which further routes the call. Thus, the client only needs to initiate a connection to the proxy and not a connection to the called subject. This reduces computational complexity.

In a ninth possible implementation form of the method according to the first aspect as such or according to any of the preceding implementation forms of the first aspect, the factory method design pattern is configured to design an interface for creating an object.

The object can be flexibly created at runtime, thereby providing the desired flexibility in program development.

In a tenth possible implementation form of the method according to the ninth implementation form of the first aspect, classes of the object-oriented programming language that implement the interface decide which class to instantiate.

When classes of the object-oriented programming language that implement the interface decide which class to instantiate, generic programming is supported.

In an eleventh possible implementation form of the method according to the first aspect as such or according to any of the preceding implementation forms of the first aspect, the nodes of the graph data structure are one of the following: parts of the graph data structure, external entities represented by integer indices, external entities represented by references.

Nodes of the graph can be flexibly chosen. The graph can also support external entities.

Thus, the method provides an improved technique for compiling a source code, in particular for the subtask of constructing intermediate representation of the source code.

In a twelfth possible implementation form of the method according to the first aspect as such or according to any of the preceding implementation forms of the first aspect, the object-oriented programming language comprises the following features: virtual methods, abstract methods and parameterized types.

Thus, the method provides a function or method whose behavior can be overridden within an inheriting class by a function with the same signature. The method further provides abstract methods with only a signature and no implementation body. The method further provides generics, i.e. a family of related types.

In a thirteenth possible implementation form of the method according to the first aspect as such or according to any of the preceding implementation forms of the first aspect, the object-oriented programming language is Java.

The method can be implemented in the common language Java which is a standard programming language and easy to implement.

The object-oriented language, however, does not have to be Java, it can be any other object-oriented language fulfilling the requirements of the twelfth implementation form, i.e. providing virtual methods, abstract methods and parameterized types.

According to a second aspect, an embodiment of the invention relates to an apparatus for compiling a source code into executable machine code running on a processor of a computer system, the apparatus comprising: construction means configured for constructing a graph data structure as an intermediate representation of the source code, wherein program operations of the source code are represented in an object-oriented programming language by objects of classes that form a hierarchy growing from a base node class of the graph data structure, the construction means comprising: production means configured for producing new nodes of the graph data structure by calling factory methods associated with existing nodes of the graph data structure based on a factory method design pattern implemented in the nodes of the graph data structure, wherein the nodes of the graph data structure are identified by symbols; and proxy means configured for using the symbols as proxies of the nodes of the graph data structure according to a proxy design pattern.

The apparatus according to the second aspect may be implemented in a compiler of a computer system. The apparatus is able to eliminate boilerplate code in building the graph-based intermediate representation of programs when performed in an object-oriented language. The apparatus further allows implementing graph-based intermediate representation in an object-oriented language to easily support generic programs.

According to a third aspect, an embodiment of the invention relates to a method for constructing an intermediate representation by staged evaluation of a source program, the method comprising: using an object-oriented language; using a graph-based intermediate representation where program operations are represented by objects of classes that form a hierarchy growing from the base node class; using a factory method design pattern implemented in graph nodes for producing new nodes by calling methods of existing ones; and using symbols representing graph node identifiers in the graph-based intermediate representation as proxies of their nodes for implementing a proxy design pattern.

According to a fourth aspect, an embodiment of the invention relates to a method according to the first aspect, where the method is used in an even broader context, not limited to object-oriented languages. That is, object-oriented mechanisms such as inheritance and virtual methods are implemented by more basic constructs of other general purpose languages such as C or assembler.

The methods, systems and devices described herein may be implemented as software in a Digital Signal Processor (DSP), in a micro-controller or in any other side-processor or as hardware circuit within an application specific integrated circuit (ASIC).

Embodiments of the invention can be implemented in digital electronic circuitry, or in computer hardware, firmware, software, or in combinations thereof, e.g. in available hardware of conventional mobile devices or in new hardware dedicated for processing the methods described herein.

BRIEF DESCRIPTION OF THE DRAWINGS

Further embodiments of the invention will be described with respect to the following figures, in which:

FIG. 5 shows a listing of a source code representing conventional programming interfaces 500 of the classes that are used to represent graphs as data structure in machine memory;

FIG. 11 shows a listing of a source code 1100 illustrating factory methods of array class according to an implementation form;

FIG. 14 shows a listing of a source code 1400 illustrating generalized classes of graph data structure according to an implementation form;

FIG. 15 shows a listing of a source code 1500 illustrating a staged evaluation method according to an implementation form;

FIG. 16 shows a listing of program code 1600 representing core methods for constructing a graph data structure according to an implementation form.

DESCRIPTION OF EMBODIMENTS

Figure 1:
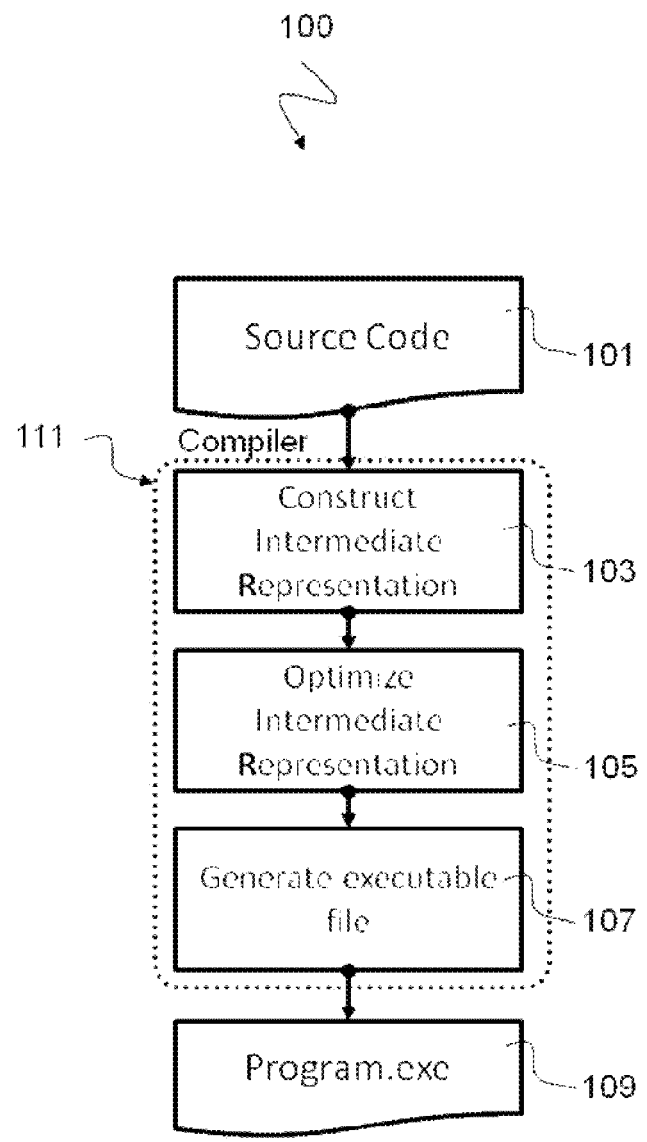
FIG. 1 shows a schematic diagram of a conventional compiling process 100 for compiling a source code into instructions of a processor of a computer system.
Figure 8:
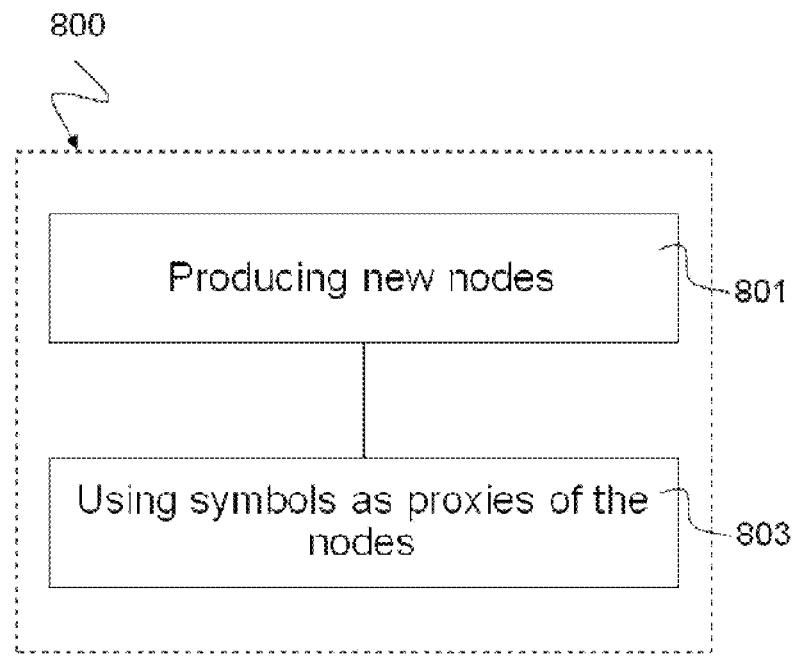
FIG. 8 shows a schematic diagram of a method 800 for constructing a graph data structure according to an implementation form.

FIG. 8 shows a schematic diagram of a method 800 for constructing a graph data structure according to an implementation form. The method 800 is used for constructing the graph data structure as an intermediate representation of source code for a compiler, for example a compiler 111 as described with respect to FIG. 1. The compiler is configured for compiling the source code into executable machine code which runs on a processor of a computer system. The program operations of the source code are represented in an object-oriented programming language by objects of classes that form a hierarchy growing from a base node class of the graph data structure. The method 800 comprises producing new nodes 801 of the graph data structure by calling factory methods associated with existing nodes of the graph data structure based on a factory method design pattern implemented in the nodes of the graph data structure, wherein the nodes of the graph data structure are identified by symbols. The method 800 comprises using 803 the symbols as proxies of the nodes of the graph data structure according to a proxy design pattern.

In an implementation form of the method 800, each node of the graph data structure is implemented as an object of a class. In an implementation form of the method 800, the symbols are used as typed proxies to the corresponding nodes of the graph data structure. In an implementation form of the method 800, the factory methods use instances of the symbols, so that when a method of a symbol is called, the corresponding method of the node is executed. In an implementation form of the method 800, depending on a type of a node of the graph data structure each class of the node comprises factory methods. In an implementation form of the method 800, the factory methods are configured to produce the new nodes along with connections to the existing nodes. In an implementation form of the method 800, each factory method comprises a subroutine associated with a class of the node of the graph data structure, the factory method determining a behavior to be exhibited by instances of the associated class at program runtime. In an implementation form of the method 800, the proxy comprises a class functioning as an interface to a subject. In an implementation form of the method 800, the proxy design pattern is configured to provide a proxy with a factory method for delegating calls of a client calling the factory method of the proxy to a called subject. In an implementation form of the method 800, the factory method design pattern is configured to design an interface for creating an object. In an implementation form of the method 800, classes of the object-oriented programming language that implement the interface decide which class to instantiate. In an implementation form of the method 800, the nodes of the graph data structure are one of the following: parts of the graph data structure, external entities represented by integer indices, external entities represented by references. In an implementation form of the method 800, the object-oriented programming language comprises the following features: virtual methods, abstract methods and parameterized types.

The method 800 solves the problems identified by analysis of prior art and eliminates the limitations of graph-based IR. The method 800 implements a staged evaluation technique in object-oriented languages and can be applied for generic programs.

An execution of a program to calculate a resulting value is just one of possible interpretations of its source code and is typically defined by the operational semantics of the source language. The same source code can also be used in a different way, i.e. using different semantics.

Instead of executing the program for calculation it can be executed for generation of intermediate representation (IR). This execution is termed as "staged evaluation", i.e. evaluation that is separated into two stages: First IR generation and secondly IR execution. Evaluation is called "staged" to reflect the fact that the same program can have both operational semantics of source language and also staged evaluation semantics.

Figure 2:
FIG. 2 shows a listing of a conventional source program 200 to be compiled by the compiling process 100 of FIG. 1.
Figure 3:
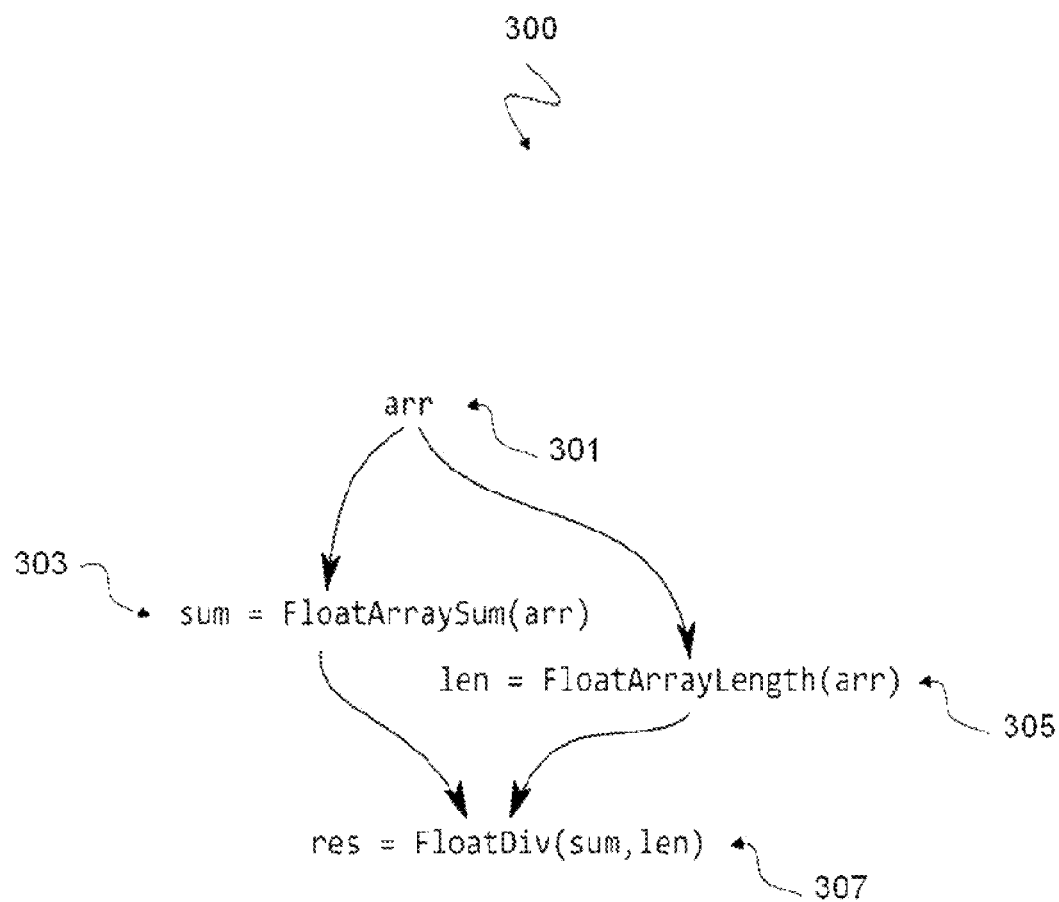
FIG. 3 shows a conventional graph based intermediate representation 300 for the program 200 shown in FIG. 2.
Figure 4:
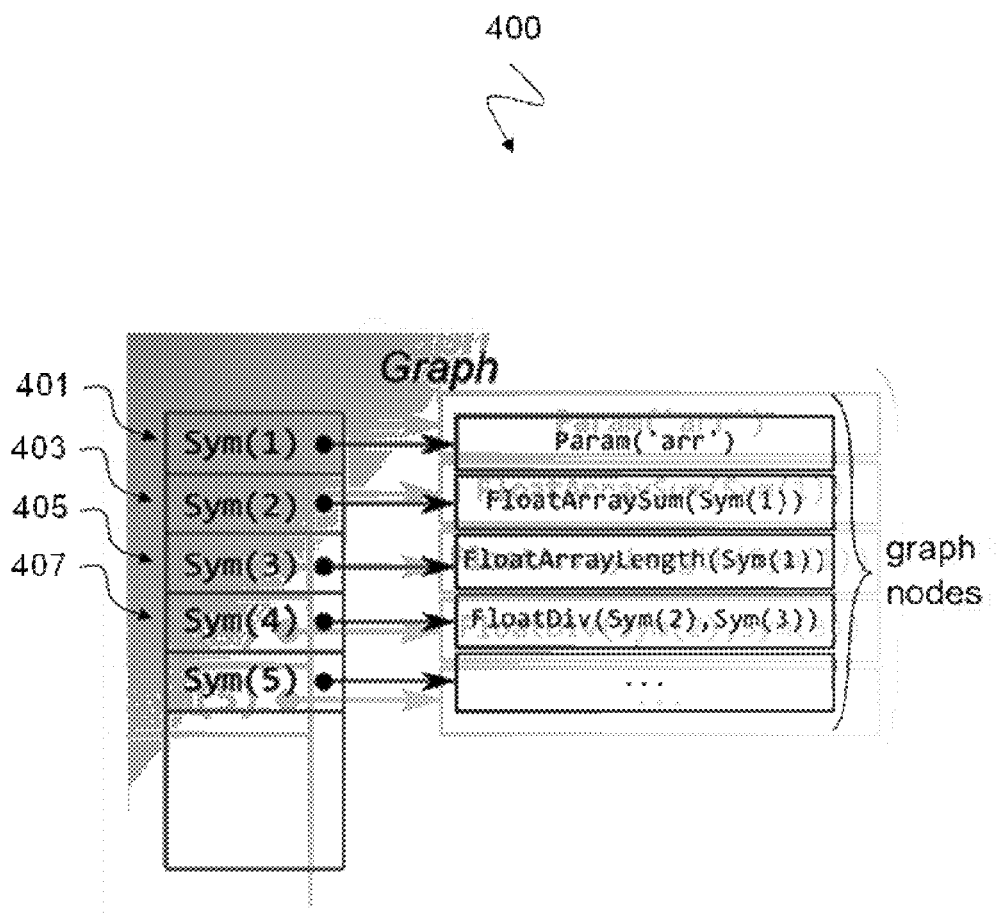
FIG. 4 shows a conventional in-memory representation 400 for the program graph 300 shown in FIG. 3.

In staged evaluation, instead of resulting data value, the result of executing the program is an IR. IR is a data structure that keeps track of all the operations that were used in the program along with their order. In the example in FIG. 2 the program uses summation, calculation of length and division operations. The method 800 uses graph-based IR, so the result of staged evaluation is a graph of the program which is also called program graph, or simply a graph. The program graph for the example of FIG. 2 is shown in FIG. 3. The resulting graph is an internal in-memory representation of the source code. This technique of staged evaluation can be implemented in object-oriented language.

Figure 7:
FIG. 7 shows a conventional source program using a type parameter for constructing the graph 300 depicted in FIG. 3.

In an implementation, the method 800 is developed in the following steps: In step 1, the role of graph nodes in the graph building process is changed. Besides representing operation each node can also be used to produce new nodes. Since, as it is shown in FIG. 5, each node is implemented as an object of a class methods are added to classes of nodes in such a way that a graph is extended, i.e. constructed by calling or invoking those methods. This is described below with respect to FIG. 11. In object-oriented terms each graph node is made to play a role of "factory" of other nodes by implementing a so called "Factory method" design pattern. In step 2, interfaces of Graph, Node, Sym (symbol) classes are generalized and the "staged evaluation" technique is implemented. The generalized version of the "average" example program shown in FIG. 7 can be staged and implemented by methods according to the embodiment of the invention. The staged version is shown in FIG. 15. The implementation of "staged evaluation" is further described below with respect to FIG. 15. It is based on a well-known Proxy design pattern which is described below with respect to FIGS. 11 and 12.

Figure 9:
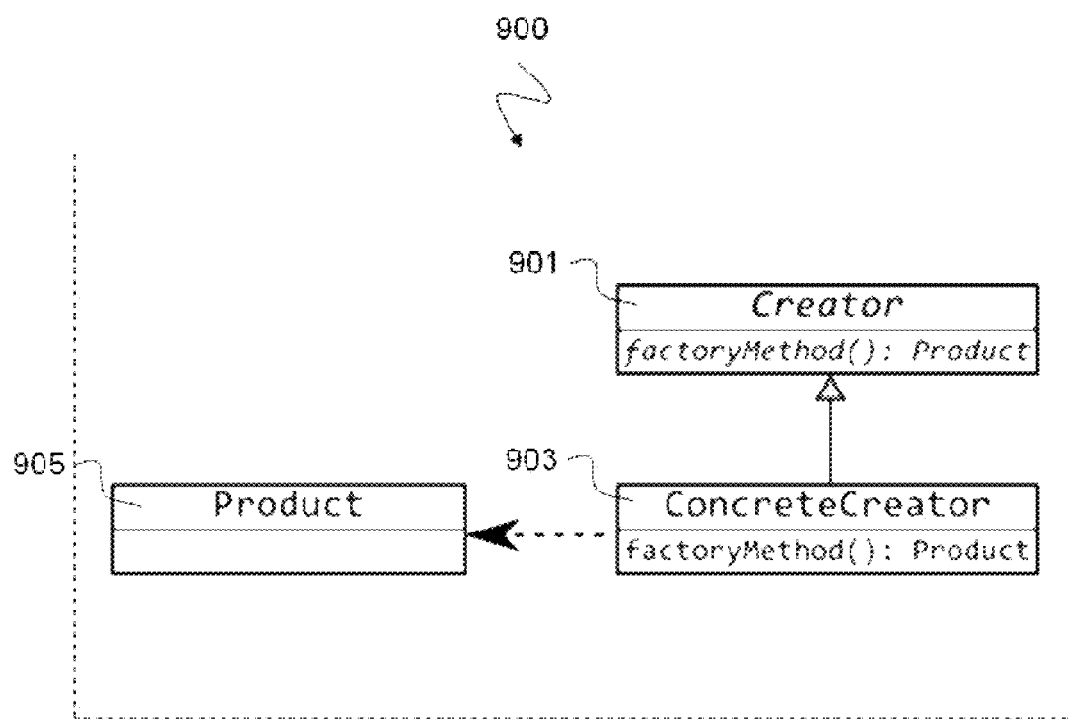
FIG. 9 shows a schematic diagram of a factory method design pattern 900 according to an implementation form.

FIG. 9 shows a schematic diagram of a factory method design pattern 900 according to an implementation form. The factory method design pattern is an implementation of the factory method design pattern as described above with respect to FIG. 8.

Figure 6:
FIG. 6 shows a listing of a source code representing a conventional graph building process for the graph 300 depicted in FIG. 3.

The "Factory method" design pattern 900 shown in FIG. 9 solves the problem of creating nodes without specifying the exact class of node that will be created. The object "ConcreteCreator" 903 comprising a function "factoryMethod( ): Product" provides information to an object "Creator" 901 comprising the function "factoryMethod( ): Product" and to an object "Product" 905. By that factory method design pattern 900 the graph building code as shown in FIG. 6 is generalized.

Figure 10:
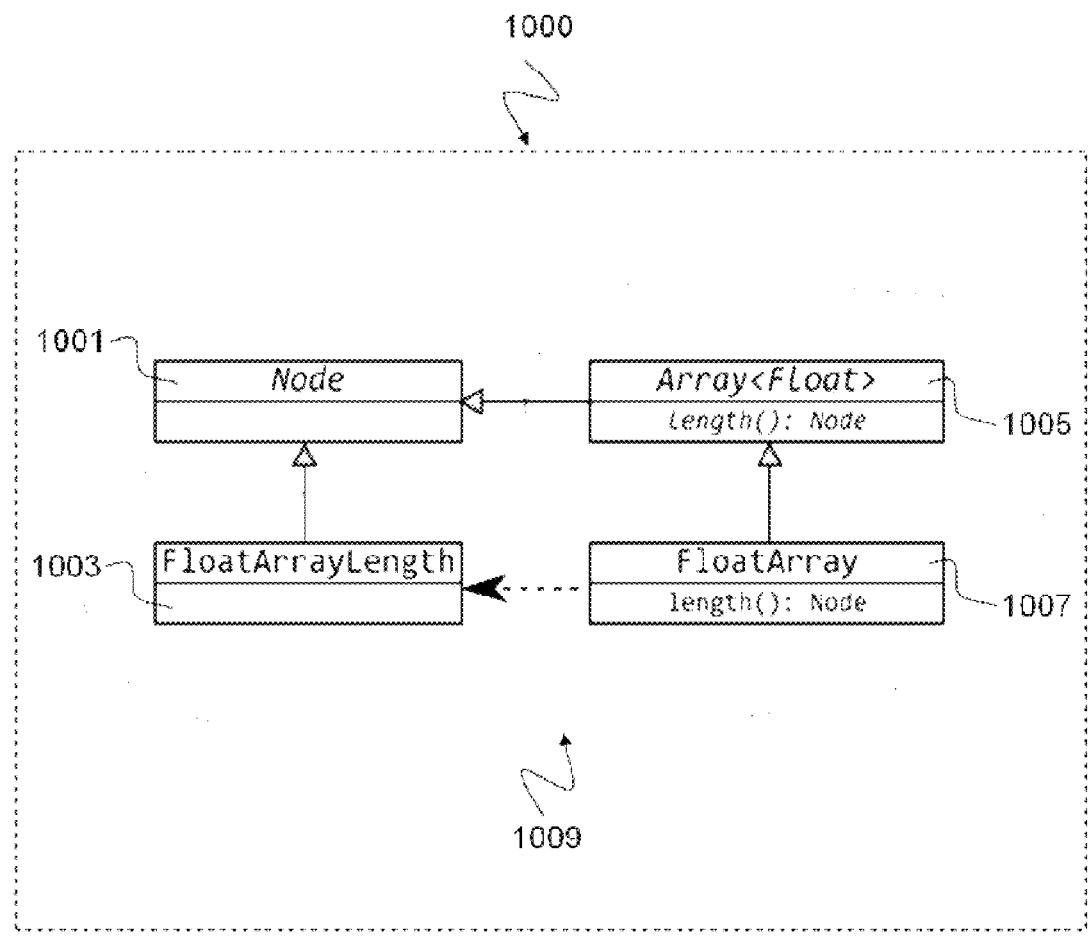
FIG. 10 shows a schematic diagram illustrating application of a factory method pattern 1000 to array nodes 1001 according to an implementation form.

FIG. 10 shows a schematic diagram illustrating application of a factory method pattern 1000 to array nodes 1001 according to an implementation form. The array nodes 1001 may correspond to the nodes of the graph data structure as described above with respect to FIG. 8.

The factory method pattern 1000 is applied to a node 1001 of a graph. The factory method pattern 1000 comprises the objects "FloatArray" 1007, "Array<Float>" 1005 and FloatArrayLength 1003. The object "FloatArray" 1007 comprising the function "length( ): Node" provides information to the object "Array<Float>" 1005 comprising the function "Length( ): Node" and to the object "FloatArrayLength" 1003.

The concept of the factory method pattern 1000 is to extend prior art IR and allow graph nodes to play an additional "factory" role. Depending on the types of nodes each class of node (the class is derived from the Node class) can contain one or more factory methods. These factory methods, when called, produce new graph nodes along with connections to already existing nodes supplied either explicitly or implicitly via arguments. The factory method pattern 1000 after applying it to node class is depicted in FIG. 10.

FIG. 11 shows a listing of a source code 1100 illustrating factory methods 1103 of an array class 1101 according to an implementation form. The factory methods are an implementation of the factory methods as described above with respect to FIG. 8.

Methods of class Array 1101 as shown in FIG. 11 are array methods that are used in the example program illustrated in FIG. 2. In class FloatArray 1101 it can be seen (see method length) how they can produce new nodes of a graph and thus can be used as factory methods. The factory method "length( )" 1103 produces a new node by returning the function "FloatArrayLength(nodeSymbol)" 1105 which provides the symbol parameter "nodeSymbol" to the new node.

A graph node of type Array<T> 1107 is given for some type T where the exact type is not known and the statement len=arr.length( ) is executed. Because the graph data structure and nodes as part of it is implemented as objects of classes, this statement is a method call and it is executed as a virtual method call. So, the exact implementation of the method length, that is called, depends on the exact class of the Array object referenced by the variable "arr". If the exact class of variable "arr" is "FloatArray" 1101 then its method length 1103 is called. The result of the execution is a symbol "nodeSymbol" corresponding to the newly created graph node of type "FloatArrayLength". Note that when the method length 1103 of the instance of "FloatArray" class 1101 is called, the field "g" has already been initialized to the owner graph so a newly created node will belong to the same graph "g" as this "factory node".

Figure 12:
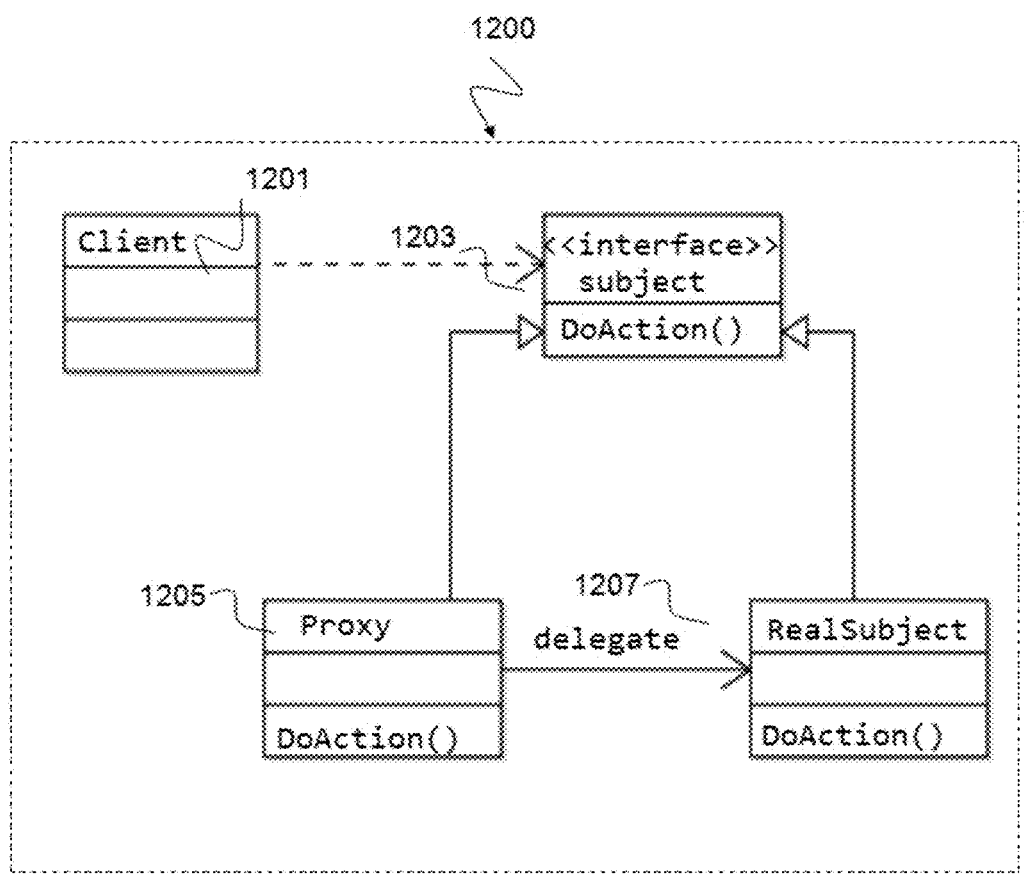
FIG. 12 shows a schematic diagram illustrating a proxy design pattern 1200 according to an implementation form.

FIG. 12 shows a schematic diagram illustrating a proxy design pattern 1200 according to an implementation form. The proxy design pattern 1200 is an implementation of the proxy design pattern as described above with respect to FIG. 8.

The key idea of proxy design pattern 1200 is to regard symbol (Sym) objects as proxy objects for corresponding node objects.

The proxy 1205 is a class functioning as an interface to a subject "RealSubject" 1207. The client 1201 does not have to directly access the subject 1207. Instead, the client 1201 calls methods of the proxy 1207 which delegate the calls to the subject "RealSubject" 1207.

Figure 13:
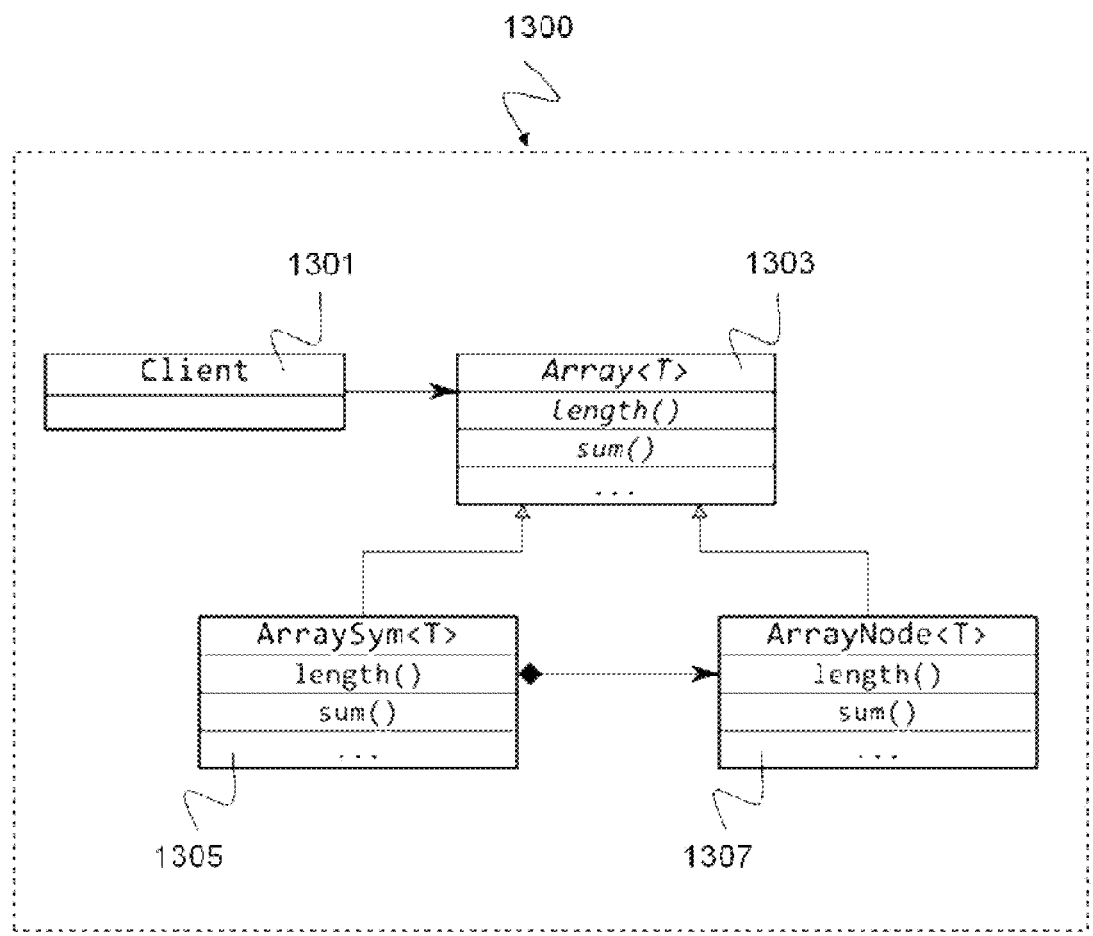
FIG. 13 shows a schematic diagram illustrating an application of the proxy design pattern of FIG. 12 to array nodes 1307 and symbols 1305 according to an implementation form.

FIG. 13 shows a schematic diagram illustrating an application of the proxy design pattern 1200 of FIG. 12 to array nodes 1307 and symbols 1305 according to an implementation form.

The proxy "ArraySym<T>" 1305 is functioning as an interface to the subject "ArrayNode<T>" 1307. The client 1301 does not have to directly access the subject "ArrayNode<T>" 1307. Instead, the client 1301 calls methods of the proxy "ArraySym<T>" 1305 which delegate the calls to the subject "ArrayNode<T>" 1307.

FIG. 14 shows a listing of a source code 1400 illustrating generalized classes of a graph data structure according to an implementation form. The graph data structure is an implementation of the graph data structure as described above with respect to FIG. 8.

Interfaces and classes of graph data structure are generalized by introducing type parameters and making classes generic.

For each class of nodes that implements some factory interface a class of symbols is defined that implements the same interface. This can be seen from FIG. 14 where class "ArrayNode" 1401 implements factory interface "Array" 1403 and class "ArraySym" 1405 implements the same factory interface "Array" 1403.

By using that design, symbols which are objects of the class "Sym<T>" 1407 are used as typed proxies to corresponding nodes. That design allows calling factory methods as described above with respect to FIGS. 9 and 10 of nodes using instances of symbols, so that when a method of a symbol is called, e.g. by using "arr.length( )" of FIG. 15 described below, then the corresponding method of the node is executed.

Note that no concrete mechanism is specified to implement a proxy pattern. Any implementation is relevant and can be used.

FIG. 15 shows a listing of a source code 1500 illustrating a staged evaluation method according to an implementation form. The staged evaluation method is an implementation of the method 800 for constructing a graph as described above with respect to FIG. 8.

The listing of the source code 1500 is obtained by generalizing a graph construction code from explicit graph construction by applying a "staged evaluation" method to the graph construction. FIG. 15 shows implementation using an "Array" class as an example but the method can be applied to any class.

The code shown in FIG. 15 is executed as described in the following. When the function average is called in line 1, the parameter "arr" contains a symbol of type "ArraySym<T>" which is a proxy of a node of type "ArrayNode<T>" for some type "T". Note that "T" is a type parameter so the function is generic.

In line 2, the method "sum( )" of the class "ArraySym<T>" is invoked. This invocation is delegated to the corresponding array node. For example, if T=Float, i.e. type "T" is of type floating-point, then delegation is performed to method "sum( )" of class "FloatArray" which creates a new node of the graph and returns its symbol. This symbol is returned as proxy method call and stored in the variable "sum".

In line 3, the statement is executed as described in line 2 only instead of method "sum( )" the method "length( )" is called and the result is stored in a variable "len".

In line 4, a division operation is performed. Because this is a staged version of the original program, the original operation 7' is replaced with a method invocation of a special object. Here, this object is represented by the variable "div". Note, that this object has a parameterized type. Application of the method of the class "DivOp<T>" that is called here creates a new node of the graph of type "FloatDiv" if type "T" is of type "Float". The method uses the symbols "sum" and "len" to connect this new node with the graph. As described above, "FloatDiv" is a class that represents the division ('/') operation of the source program described above with respect to FIG. 2 in the graph based IR.

When the method average is completed in line 5, the result is a symbol returned by the method "apply". Here, the graph is extended with new nodes as side effect of executing both, the average function and also all its statements.

FIG. 16 shows a listing of program code 1600 representing core methods for constructing a graph data structure according to an implementation form. The graph data structure is an implementation of the graph data structure as described above with respect to FIG. 8.

The graph or graph data structure "Graph" 1601 comprises a lookup table "Hashtable" 1603 for storing all nodes of the graph 1601. The graph 1601 comprises a proxy symbol creator "createProxySym" 1605 for creating a proxy symbol for the node. An implementation of these methods can use any existing method to implement proxy design pattern, i.e. also other methods not specified in this description. The graph 1601 comprises a finding node operator "findNode" 1607 for finding a node in the graph 1601. The graph 1601 comprises an adding operator "addNode" 1609 for adding a node to this graph 1601. The graph 1601 comprises a finding symbol operator "toSymbol" 1611 for finding a symbol of a node in the graph 1601. The finding symbol operator "toSymbol" 1611 either finds the symbol of the node if it is in the graph 1601 or it adds the node to the graph 1601. The graph 1601 further comprises a lookup operator "getNode" 1613 for looking up a node by its symbol.

Figure 17:
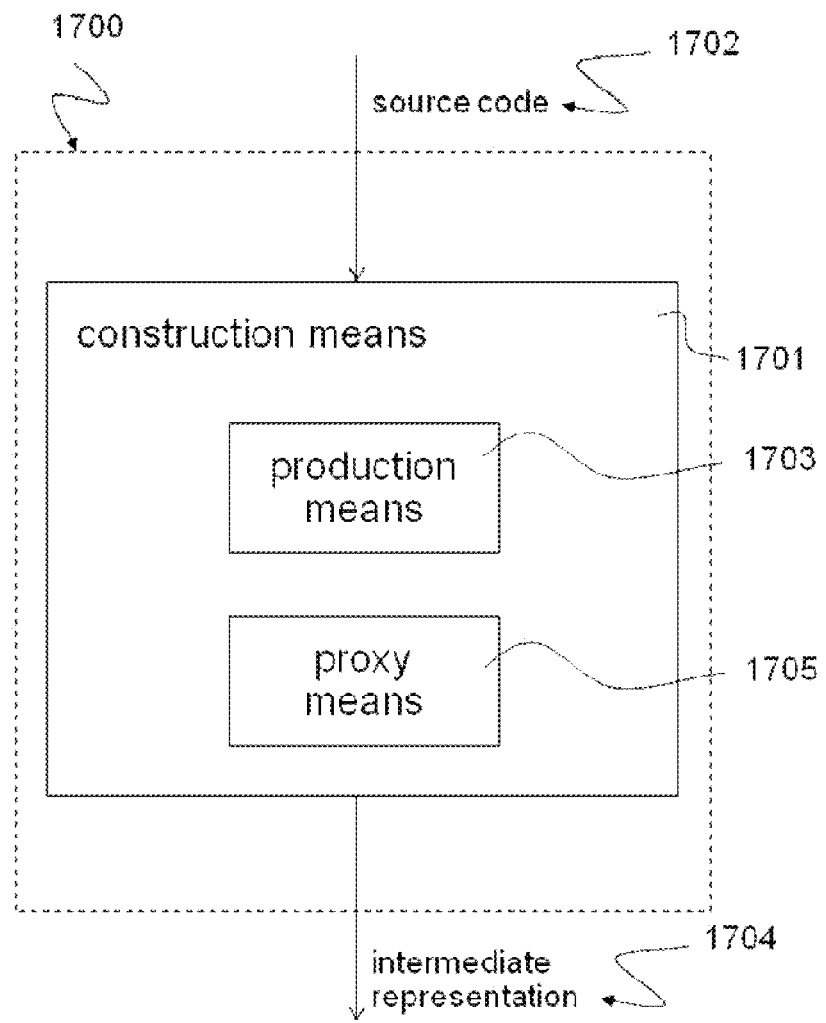
FIG. 17 shows an apparatus 1700 for compiling a source code into executable machine code according to an implementation form.

FIG. 17 shows an apparatus 1700 for compiling source code 1702 into executable machine code according to an implementation form. The machine code is configured to run on a processor of a computer system. The apparatus 1700 comprises construction means 1701 for receiving the source code 1702 and providing an intermediate representation of the source code.

The construction means 1701 are configured for constructing a graph data structure as an intermediate representation of the source code 1702. The program operations of the source code 1702 are represented in an object-oriented programming language by objects of classes that form a hierarchy growing from a base node class of the graph data structure. The construction means 1701 comprises production means 1703 and proxy means 1705.

The production means 1703 are configured for producing new nodes of the graph data structure by calling factory methods associated with existing nodes of the graph data structure based on a factory method design pattern implemented in the nodes of the graph data structure. The nodes of the graph data structure are identified by symbols. The proxy means 1705 are configured for using the symbols as proxies of the nodes of the graph data structure according to a proxy design pattern.

In an implementation form, the apparatus 1700 further comprises optimization means configured for optimizing the intermediate representation 1704. In an implementation form, the apparatus 1700 further comprises generation means configured for generating the executable machine code.

The construction means 1701 may be used for an improved construction 103 of the intermediate representation as described above with respect to FIG. 1. The optimization means may be used for optimizing 105 the intermediate representation as described above with respect to FIG. 1. The generation means may be used for generating the executable machine code 109 as described above with respect to FIG. 1. In an implementation, the apparatus 1700 is applied in a compiler 111 as described above with respect to FIG. 1.

The apparatus 1700 may be used for implementing the method 800 as described above with respect to FIG. 8.

From the foregoing, it will be apparent to those skilled in the art that a variety of methods, systems, computer programs on recording media, and the like, are provided.

The present disclosure also supports a computer program product including computer executable code or computer executable instructions that, when executed, causes at least one computer to execute the performing and computing steps described herein.

Many alternatives, modifications, and variations will be apparent to those skilled in the art in light of the above teachings. Of course, those skilled in the art readily recognize that there are numerous applications of the invention beyond those described herein. While the present inventions has been described with reference to one or more particular embodiments, those skilled in the art recognize that many changes may be made thereto without departing from the scope of the present invention. It is therefore to be understood that within the scope of the appended claims and their equivalents, the inventions may be practiced otherwise than as specifically described herein.

What is claimed is:

1. A computer-implemented method for constructing a graph data structure as an intermediate representation of a source code, for a compiler configured for compiling the source code into executable machine code running on one or more processors, wherein the source code is represented in an object-oriented programming language by objects of classes, the method being implemented by one or more processors and comprising:
   obtaining an operation in the source code, the operation comprising an operand;
   creating a first new node of the graph data structure using the operand, wherein the new node comprises a factory method;
   producing one or more new nodes of the graph data structure by calling the factory method of the first new node, and subsequently producing more new nodes by calling factory methods in existing nodes in the graph data structure until all nodes of the graph data structure are represented by symbols, wherein an existing node of the graph data structure comprises a factory method based on a type of the first new node of the graph data structure and is associated with a class, and wherein producing a new node using the existing node comprises calling a factory method of the class associated with the existing node and returning a corresponding function to provide a corresponding symbol to the new node; and
   using the symbols as proxies of the nodes of the graph data structure to generate functional calls for implementing the source code.

2. The method of claim 1, wherein each node of the graph data structure is implemented as an object of a class.

3. The method of claim 1, wherein the symbols are used as typed proxies to the corresponding nodes of the graph data structure.

4. The method of claim 3, wherein the factory methods use instances of the symbols, so that when a method of a symbol is called the corresponding method of the node is executed.

5. The method of claim 1, wherein the factory methods are configured to produce the new nodes along with connections to the existing nodes.

6. The method of claim 1, wherein the proxy comprises a class functioning as an interface to a subject.

7. The method of claim 1, wherein using the symbols as proxies of the nodes of the graph data structure to generate functional calls for implementing the source code comprises providing a proxy with a factory method for delegating calls of a client calling the factory method of the proxy to a called subject.

8. The method of claim 1, wherein the new nodes are produced according to a factory method design pattern, and the factory method design pattern is configured to design an interface for creating an object.

9. The method of claim 8, wherein classes of the object-oriented programming language that implement the interface decide which class to instantiate.

10. The method of claim 1, wherein the nodes of the graph data structure are one of the following: parts of the graph data structure, external entities represented by integer indices, external entities represented by references.

11. The method of claim 1, wherein the object-oriented programming language comprises the following features: virtual methods, abstract methods and parameterized types.

12. A computing device capable of compiling a source code into executable machine code running on one or more processors, the computing device comprising:
   a memory storage comprising instructions; and
   one or more processors in communication with the memory storage, wherein the one or more processors execute the instructions for:
   constructing a graph data structure as an intermediate representation of the source code, wherein the source code is represented in an object-oriented programming language by objects of classes, the constructing further comprising:
   obtaining an operation in the source code, the operation comprising an operand;
   creating a first new node of the graph data structure using the operand, wherein the new node comprises a factory method;
   producing one or more new nodes of the graph data structure by calling the factory method of the first new node, and subsequently producing more new nodes by calling factory methods in existing nodes in the graph data structure until all nodes of the graph data structure are represented by symbols, wherein an existing node of the graph data structure comprises a factory method based on a type of the first new node of the graph data structure and is associated with a class, and wherein producing a new node using the existing node comprises calling a factory method of the class associated with the existing node and returning a corresponding function to provide a corresponding symbol to the new node; and
   using the symbols as proxies of the nodes of the graph data structure to generate functional calls for implementing the source code.

13. A non-transitory computer-readable medium storing computer instructions for implementing a method for constructing a graph data structure as an intermediate representation of source code for a compiler, that when executed by one or more processors, cause the one or more processors to compile the source code into executable machine code running on the one or more processors, wherein the source code is represented in an object-oriented programming language by objects of classes, the method comprising:
   obtaining an operation in the source code, the operation comprising an operand;
   creating a first new node of the graph data structure using the operand, wherein the new node comprises a factory method;
   producing one or more new nodes of the graph data structure by calling the factory method of the first new node, and subsequently producing more new nodes by calling factory methods in existing nodes in the graph data structure until all nodes of the graph data structure are represented by symbols, wherein an existing node of the graph data structure comprises a factory method based on a type of the first new node of the graph data structure and is associated with a class, and wherein producing a new node using the existing node comprises calling a factory method of the class associated with the existing node and returning a corresponding function to provide a corresponding symbol to the new node; and using the symbols as proxies of the nodes of the graph data structure to generate functional calls for implementing the source code.

\* \* \* \* \*